(12) United States Patent
Knight et al.

(10) Patent No.: US 10,713,443 B1
(45) Date of Patent: Jul. 14, 2020

(54) MACHINE LEARNING MODEL FOR COMPUTER-GENERATED PATENT APPLICATIONS TO PROVIDE SUPPORT FOR INDIVIDUAL CLAIM FEATURES IN A SPECIFICATION

(71) Applicant: Specifio, Inc., Marina del Rey, CA (US)

(72) Inventors: Kevin Knight, Marina Del Rey, CA (US); Ian C. Schick, Hermosa Beach, CA (US); Jay Priyadarshi, Los Angeles, CA (US)

(73) Assignee: Specifio, Inc., Marina del Rey, CA (US)

( * ) Notice: Subject to any disclaimer, the term of this patent is extended or adjusted under 35 U.S.C. 154(b) by 79 days.

(21) Appl. No.: 15/994,756

(22) Filed: May 31, 2018

Related U.S. Application Data

(60) Provisional application No. 62/526,316, filed on Jun. 28, 2017, provisional application No. 62/526,314,
(Continued)

(51) Int. Cl.
*G06F 40/20* (2020.01)
*G06F 40/289* (2020.01)
(Continued)

(52) U.S. Cl.
CPC ........... *G06F 40/56* (2020.01); *G06F 40/289* (2020.01); *G06Q 50/184* (2013.01)

(58) Field of Classification Search
CPC ...... G06F 17/21; G06F 17/27; G06F 17/2775; G06F 17/2785; G06F 17/2795;
(Continued)

(56) References Cited

U.S. PATENT DOCUMENTS 6,014,663 A * 1/2000 Rivette .................. G06F 17/24
707/690
6,049,811 A 4/2000 Petruzzi et al.
(Continued)

OTHER PUBLICATIONS

Akihiro Shinmori et al: "Patent claim processing for readability", Patent Corpus Processing, Association for Computational Linguistics, N. Eight Street, Stroudsburg, PA, 18360 07960-1961, USA, Jul. 12, 2003 (Jul. 12, 2003), pp. 56-65, XP058144498, DOI: 10.3115/1119303.1119310, abstract, Sections 1-3.
(Continued)

*Primary Examiner* — Martin Lerner
(74) *Attorney, Agent, or Firm* — Esplin & Associates, PC

(57) ABSTRACT

Systems and methods for enhancing the depth and richness of content in computer-generated patent applications by providing non-explicit support for individual claim features are disclosed. Exemplary implementations may: receive a previously unseen claim feature, the previously unseen claim feature being absent from the previously received patent documents; provide one or more sentences of never-been-seen-before computer-generated text using the trained machine learning model and the previously unseen claim feature as input; and insert the one or more sentences of non-explicit support in a draft patent application proximal to explicit support for the previously unseen claim feature.

18 Claims, 2 Drawing Sheets

Related U.S. Application Data filed on Jun. 28, 2017, provisional application No. 62/523,262, filed on Jun. 22, 2017, provisional application No. 62/523,258, filed on Jun. 22, 2017, provisional application No. 62/523,257, filed on Jun. 22, 2017, provisional application No. 62/523,260, filed on Jun. 22, 2017, provisional application No. 62/519,850, filed on Jun. 14, 2017, provisional application No. 62/519,852, filed on Jun. 14, 2017, provisional application No. 62/519,847, filed on Jun. 14, 2017, provisional application No. 62/516,640, filed on Jun. 7, 2017, provisional application No. 62/515,096, filed on Jun. 5, 2017.

(51) Int. Cl.
*G06F 40/56* (2020.01)
*G06Q 50/18* (2012.01)

(58) Field of Classification Search
CPC ...... G06F 40/20; G06F 40/205; G06F 40/247; G06F 40/279; G06F 40/284; G06F 40/289; G06Q 50/184
USPC ...... 704/1, 2, 4, 9; 706/15, 16, 12; 715/255, 715/256; 705/310
See application file for complete search history.

(56) References Cited

U.S. PATENT DOCUMENTS

| | | | |
|---|---|---|---|
| 6,434,580 B1 | 8/2002 | Takano et al. | |
| 8,041,739 B2* | 10/2011 | Glasgow | G06Q 10/10 |
| | | | 707/791 |
| 8,843,821 B2 | 9/2014 | Tran | |
| 9,195,647 B1 | 11/2015 | Zhang | |
| 9,542,360 B2 | 1/2017 | Tran | |
| 9,600,566 B2* | 3/2017 | Ganti | G06F 17/2795 |
| 9,836,805 B2 | 12/2017 | Rau et al. | |
| 9,906,515 B1 | 2/2018 | Tillman et al. | |
| 9,990,351 B2 | 6/2018 | Tran | |
| 10,242,066 B2* | 3/2019 | Lundberg | G06F 17/27 |
| 10,417,341 B2* | 9/2019 | Schick | G06F 17/277 |
| 10,572,600 B2* | 2/2020 | Schick | G06Q 50/184 |
| 2001/0049707 A1 | 12/2001 | Tran | |
| 2003/0065637 A1 | 4/2003 | Glasgow | |
| 2005/0144177 A1 | 6/2005 | Hodes | |
| 2005/0261891 A1* | 11/2005 | Chan | G06F 17/27 |
| | | | 704/9 |
| 2006/0190807 A1 | 8/2006 | Tran | |
| 2007/0174039 A1 | 7/2007 | Lin et al. | |
| 2008/0147656 A1* | 6/2008 | Kahn | G06Q 10/10 |
| 2008/0281860 A1 | 11/2008 | Elias et al. | |
| 2008/0313528 A1 | 12/2008 | Chang et al. | |
| 2010/0257089 A1* | 10/2010 | Johnson | G06Q 50/184 |
| | | | 705/310 |
| 2012/0101803 A1 | 4/2012 | Popov et al. | |
| 2012/0101804 A1* | 4/2012 | Roth | G06F 17/2827 |
| | | | 704/2 |
| 2012/0296835 A1* | 11/2012 | Khan K | G06Q 50/18 |
| | | | 705/310 |
| 2013/0282599 A1* | 10/2013 | Kang | G06Q 50/184 |
| | | | 705/310 |
| 2014/0180934 A1* | 6/2014 | Surdeanu | G06Q 50/184 |
| | | | 705/310 |
| 2014/0249801 A1 | 9/2014 | Jackson | |
| 2016/0232246 A1 | 8/2016 | Rau et al. | |
| 2016/0350886 A1 | 12/2016 | Jessen et al. | |
| 2018/0113934 A1* | 4/2018 | Jablonski | G06F 17/2705 |
| 2018/0121419 A1* | 5/2018 | Lee | G06F 17/2785 |
| 2018/0232361 A1 | 8/2018 | Schick et al. | |
| 2018/0329883 A1* | 11/2018 | Leidner | G06F 17/2775 |
| 2019/0005707 A1 | 1/2019 | Yamada et al. | |
| 2019/0034416 A1* | 1/2019 | Al Hasan | G06F 17/2785 |
| 2019/0332674 A1 | 10/2019 | Schick et al. | |

OTHER PUBLICATIONS

International Search Report and Written Opinion, PCT Application No. PCT/US2018/018257, dated May 17, 2018, 15 pages.

Nadjet Bouayad-Agha et al: "Improving the comprehension of legal documentation", Artificial Intelligence and Law, ACM, 2, Penn Plaza, Suite 701 New York NY, 10121-0701 USA, Jun. 8, 2009 (Jun. 8, 2009), pp. 78-87, XP058361680, DOI: 10.1145/1568234.1568244; ISBN: 978-1-60558-597-0 abstract Sections 2-4; figures 1, 2.

Svetlana Sheremetyeva: "Natural language analysis of patent claims", Patent Corpus Processing, Association for Computational Linguistics, N. Eight Street, Stroudsburg, PA, 18360 07960-1961, USA, Jul. 12, 2003 (Jul. 12, 2003), pp. 66-73, XP058144499, DOI: 10.3115/1119303.1119311, abstract, Sections 1-4.

Tseng, Y. H., Lin, C. J., & Lin, Y. I. (2007). Text mining techniques for patent analysis. Information Processing & Management, 43(5), 1216-1247.

\* cited by examiner

MACHINE LEARNING MODEL FOR COMPUTER-GENERATED PATENT APPLICATIONS TO PROVIDE SUPPORT FOR INDIVIDUAL CLAIM FEATURES IN A SPECIFICATION

CROSS REFERENCE TO RELATED APPLICATIONS

This application claims the benefit of U.S. Provisional Application No. 62/515,096, filed Jun. 5, 2017 and entitled "SYSTEMS AND METHODS FOR PROVIDING AN AUTOMATED INTELLECTUAL PROPERTY AUCTION PLATFORM CONFIGURED TO USE AN AUTOMATED NATURAL LANGUAGE GENERATION SYSTEM TO GENERATE DRAFT PATENT APPLICATIONS BASED ON CROWDSOURCED DRAFT PATENT CLAIMS, ESTABLISH PRIORITY DATES BY BLOCKCHAIN RECORDATION AS OPPOSED TO PATENT OFFICE FILING, AND DEDICATE TO THE PUBLIC ANY INTELLECTUAL PROPERTY THAT IS NOT SUCCESSFULLY AUCTIONED"; U.S. Provisional Application No. 62/516,640, filed Jun. 7, 2017 and entitled "SYSTEMS AND METHODS FOR PROVIDING AN INTERACTIVE INTERFACE THAT ELICITS INVENTION DISCLOSURES FROM INVENTORS IN ORDER TO PRODUCE STANDARDIZED INVENTION DISCLOSURE DOCUMENTS"; U.S. Provisional Application No. 62/519,852, filed Jun. 14, 2017 and entitled "SYSTEMS AND METHODS FOR CONVERTING SHORT PLAIN-LANGUAGE FEATURE SUMMARIES INTO CLAIM LANGUAGE USING A NATURAL LANGUAGE GENERATION SYSTEM TRAINED ON PLAIN-LANGUAGE FEATURE SUMMARIES EXTRACTED FROM PATENT LITERATURE"; U.S. Provisional Application No. 62/519,850, filed Jun. 14, 2017 and entitled "SYSTEMS AND METHODS FOR GENERATING, AUTOMATICALLY AND WITHOUT HUMAN INTERVENTION, A BRIEF SECTION OF A PATENT APPLICATION BASED ON INPUT CLAIM LANGUAGE"; U.S. Provisional Application No. 62/519,847, filed Jun. 14, 2017 and entitled "SYSTEMS AND METHODS FOR MONITORING INFORMATION FLOW OF AN ORGANIZATION TO IDENTIFY POTENTIAL TOPICS FOR PATENT PROTECTION"; U.S. Provisional Application No. 62/523,257, filed Jun. 22, 2017 and entitled "SYSTEMS AND METHODS FOR OBTAINING AT ALIGNMENT BETWEEN INDIVIDUAL FEATURES OF PATENT CLAIMS AND CORRESPONDING DESCRIPTIONS IN A SPECIFICATION OF THE SAME PATENT DOCUMENT"; U.S. Provisional Application No. 62/523,258, filed Jun. 22, 2017 and entitled "SYSTEMS AND METHODS FOR SIMULATING A HUMAN-PATENT-EXAMINER-PERFORMED PATENTABILITY SEARCH BASED ON ONE OR MORE CLAIM SETS ASSOCIATED WITH A SUBJECT PATENT APPLICATION, THE SIMULATION LEVERAGING HISTORICAL HUMAN-PATENT-EXAMINER-PRODUCED PATENTABILITY SEARCH STRATEGY REPORTS"; U.S. Provisional Application No. 62/523,260, filed Jun. 22, 2017 and entitled "SYSTEMS AND METHODS FOR USING PATENT DOCUMENT FACTORING TO IDENTIFY COMBINABLE FACTOR PATENT DOCUMENTS AND A CORRESPONDING PRODUCT PATENT DOCUMENT"; U.S. Provisional Application No. 62/523,262, filed Jun. 22, 2017 and entitled "SYSTEMS AND METHODS FOR SIMULATING A HUMAN-PATENT-EXAMINER-PERFORMED PATENTABILITY SEARCH BASED ON ONE OR MORE CLAIM SETS ASSOCIATED WITH A SUBJECT PATENT APPLICATION, THE SIMULATION LEVERAGING HISTORICAL HUMAN-PATENT-EXAMINER-PRODUCED OFFICE ACTION CITATATION"; U.S. Provisional Application No. 62/526,316, filed Jun. 28, 2017 and entitled "SYSTEMS AND METHODS FOR ENHANCING THE DEPTH AND RICHNESS OF CONTENT IN COMPUTERGENERATED PATENT APPLICATIONS BY PROVIDING NON-EXPLICIT SUPPORT FOR INDIVIDUAL CLAIM FEATURES"; and U.S. Provisional Application No. 62/526,314, filed Jun. 28, 2017 and entitled "SYSTEMS AND METHODS FOR PREDICTING PATENT CLASSIFICATIONS ASSOCIATED WITH PATENT CLAIMS BASED ON A HIERARCHICAL MACHINE LEARNING CLASSIFIER", all of which are hereby incorporated by reference in their entireties.

FIELD OF THE DISCLOSURE

The present disclosure relates to systems and methods for enhancing the depth and richness of content in computer-generated patent applications by providing non-explicit support for individual claim features.

BACKGROUND

A stigma exists against computer-generated patent documents based on a belief that humans are better at using creativity to provide non-explicit support for claim features in a corresponding specification.

SUMMARY

One aspect of the present disclosure relates to a system configured for enhancing the depth and richness of content in computer-generated patent applications by providing non-explicit support for individual claim features. The system may include one or more hardware processors configured by machine-readable instructions. The processor(s) may be configured to obtain a plurality of patent documents, a given patent document including claims and a specification. The claims may define a claimed invention. The specification may describe how to make and/or use the claimed invention. The processor(s) may be configured to parse the claims into features. The features may include main features and sub features, a given main feature describing a primary element of the claimed invention, a given sub feature providing additional description of a corresponding main feature. The processor(s) may be configured to align individual features of the claims to corresponding descriptions in a specification of the same patent document as the claims. Aligning may include identifying pairs of text spans, a given pair of text spans including a first text span and a second text span. The first text span may cover one or more features of a claim. The second text span may cover one or more portions of the specification. The given pair of text spans may describe or relate to the same subject matter. The processor(s) may be configured to identify explicit support and non-explicit support in the descriptions in the specification of the individual features of the claims. The explicit support may include verbatim or near-verbatim recitation of claim features in the specification. The non-explicit support may include description that is related to a given claim feature and lacks verbatim or near-verbatim recitation of claim features. The processor(s) may be configured to train a machine learning model on input/output pairs, a given pair including an input and an output. The input may include a given claim feature parsed from a given one of the plurality of patent documents. The output may include a corresponding portion of the given one of the plurality of patent documents. The corresponding portion may include non-explicit support for the given feature. The corresponding portion may lack explicit support for the given feature. The processor(s) may be configured to receive a previously unseen claim feature, the previously unseen claim feature being absent from the previously received patent documents. The processor(s) may be configured to provide one or more sentences of never-been-seen-before computer-generated text using the trained machine learning model and the previously unseen claim feature as input. The text may convey non-explicit support for the previously unseen claim feature. The processor(s) may be configured to insert the one or more sentences of non-explicit support in a draft patent application proximal to explicit support for the previously unseen claim feature.

Another aspect of the present disclosure relates to a method for enhancing the depth and richness of content in computer-generated patent applications by providing non-explicit support for individual claim features. The method may include obtaining a plurality of patent documents, a given patent document including claims and a specification. The claims may define a claimed invention. The specification may describe how to make and/or use the claimed invention. The method may include parsing the claims into features. The features may include main features and sub features, a given main feature describing a primary element of the claimed invention, a given sub feature providing additional description of a corresponding main feature. The method may include aligning individual features of the claims to corresponding descriptions in a specification of the same patent document as the claims. Aligning may include identifying pairs of text spans, a given pair of text spans including a first text span and a second text span. The first text span may cover one or more features of a claim. The second text span may cover one or more portions of the specification. The given pair of text spans may describe or relate to the same subject matter. The method may include identifying explicit support and non-explicit support in the descriptions in the specification of the individual features of the claims. The explicit support may include verbatim or near-verbatim recitation of claim features in the specification. The non-explicit support may include description that is related to a given claim feature and lacks verbatim or near-verbatim recitation of claim features. The method may include training a machine learning model on input/output pairs, a given pair including an input and an output. The input may include a given claim feature parsed from a given one of the plurality of patent documents. The output may include a corresponding portion of the given one of the plurality of patent documents. The corresponding portion may include non-explicit support for the given feature. The corresponding portion may lack explicit support for the given feature. The method may include receiving a previously unseen claim feature, the previously unseen claim feature being absent from the previously received patent documents. The method may include providing one or more sentences of never-been-seen-before computer-generated text using the trained machine learning model and the previously unseen claim feature as input. The text may convey non-explicit support for the previously unseen claim feature. The method may include inserting the one or more sentences of non-explicit support in a draft patent application proximal to explicit support for the previously unseen claim feature.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
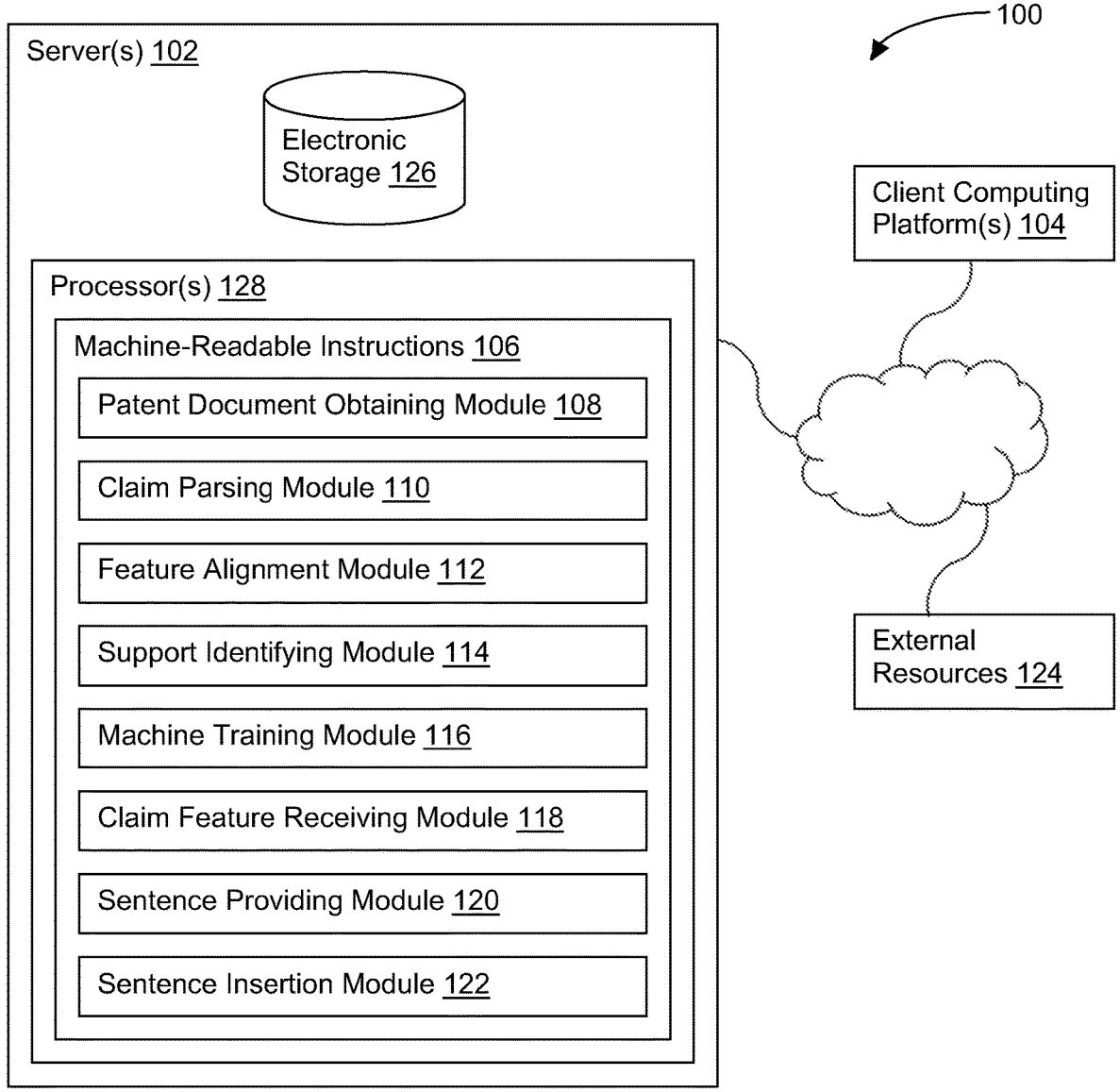
FIG. 1 illustrates a system configured for enhancing the depth and richness of content in computer-generated patent applications by providing non-explicit support for individual claim features, in accordance with one or more implementations.

FIG. 1 illustrates a system 100 configured for enhancing the depth and richness of content in computer-generated patent applications by providing non-explicit support for individual claim features, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a patent document obtaining module 108, a claim parsing module 110, a feature alignment module 112, a support identifying module 114, a machine training module 116, a claim feature receiving module 118, a sentence providing module 120, a sentence insertion module 122, and/or other instruction modules.

Patent document obtaining module 108 may be configured to obtain a plurality of patent documents, a given patent document including claims and a specification. The claims may define a claimed invention. The specification may describe how to make and/or use the claimed invention. In some implementations, the plurality of patent documents may include one or both of published patent applications or issued patents. In some implementations, the plurality of patent documents may include more than two hundred fifty thousand patent documents. In some implementations, the plurality of patent documents may include more than one million patent documents.

Claim parsing module 110 may be configured to parse the claims into features. The features may include main features and sub features, a given main feature describing a primary element of the claimed invention, a given sub feature providing additional description of a corresponding main feature.

Feature alignment module 112 may be configured to align individual features of the claims to corresponding descriptions in a specification of the same patent document as the claims. Aligning may include identifying pairs of text spans, a given pair of text spans including a first text span and a second text span. The first text span may cover one or more features of a claim. The second text span may cover one or more portions of the specification. The given pair of text spans may describe or relate to the same subject matter.

Support identifying module 114 may be configured to identify explicit support and non-explicit support in the descriptions in the specification of the individual features of the claims. The explicit support may include verbatim or near-verbatim recitation of claim features in the specification. The non-explicit support may include description that is related to a given claim feature and lacks verbatim or near-verbatim recitation of claim features. By way of non-limiting example, the non-explicit support may include one or more of relevant definitions, illustrative examples, descriptions of alternative implementations, or details not found in the claims about a claimed feature. By way of non-limiting example, the explicit support may be identifiable using one or more of an exhaustive comparison using Levenshtein distance, a locality-sensitive hashing with the Jaccard similarity metric or cosine similarity metric, or sum of word vectors.

Machine training module 116 may be configured to train a machine learning model on input/output pairs, a given pair including an input and an output. The input may include a given claim feature parsed from a given one of the plurality of patent documents. The output may include a corresponding portion of the given one of the plurality of patent documents. The corresponding portion may include non-explicit support for the given feature. The corresponding portion may lack explicit support for the given feature.

In some implementations, by way of non-limiting example, the machine learning model may include one or more of a statistical string transducer, a recurrent neural network, a sequence-to-sequence neural model, a convolutional neural network, a template extraction, a phrase-based machine translation transduction techniques, or a syntax-based machine translation transduction technique. In some implementations, the machine learning model may be configured to optimize objective functions. In some implementations, optimizing objective functions may include one or both of maximizing a likelihood of the training set or minimizing a classification error on a held-out set.

Claim feature receiving module 118 may be configured to receive a previously unseen claim feature, the previously unseen claim feature being absent from the previously received patent documents. The previously unseen claim feature may be associated with an un-filed patent application. The previously unseen claim feature may be associated with a partially-drafted patent application. The previously unseen claim feature may be associated with a computer-generated draft patent application.

Sentence providing module 120 may be configured to provide one or more sentences of never-been-seen-before computer-generated text using the trained machine learning model and the previously unseen claim feature as input. Providing the one or more sentences may include converting an input string into a fixed-length vector of real-valued numbers. Providing the one or more sentences may include using greedy decoding to produce a best word token at individual positions in the one or more sentences. Providing the one or more sentences may include using beam-search decoding to approximate a best overall output string for the one or more sentences. The text may convey non-explicit support for the previously unseen claim feature.

Sentence insertion module 122 may be configured to insert the one or more sentences of non-explicit support in a draft patent application proximal to explicit support for the previously unseen claim feature. Proximal to explicit support may include one or more of within the same paragraph, in a sentence adjacent to the explicit support, or in a sentence that is within a threshold distance to the explicit support. By way of non-limiting example, the threshold distance may include one or more of one sentence, two sentences, three sentences, four sentences, five sentences, five words, ten words, fifteen words, twenty words, twenty five words, fifty words, or one hundred words.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, 122, and/or other modules. Processor(s) 128 may be configured to execute modules 108, 110, 112, 114, 116, 118, 120, 122, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, and 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

Figure 2:
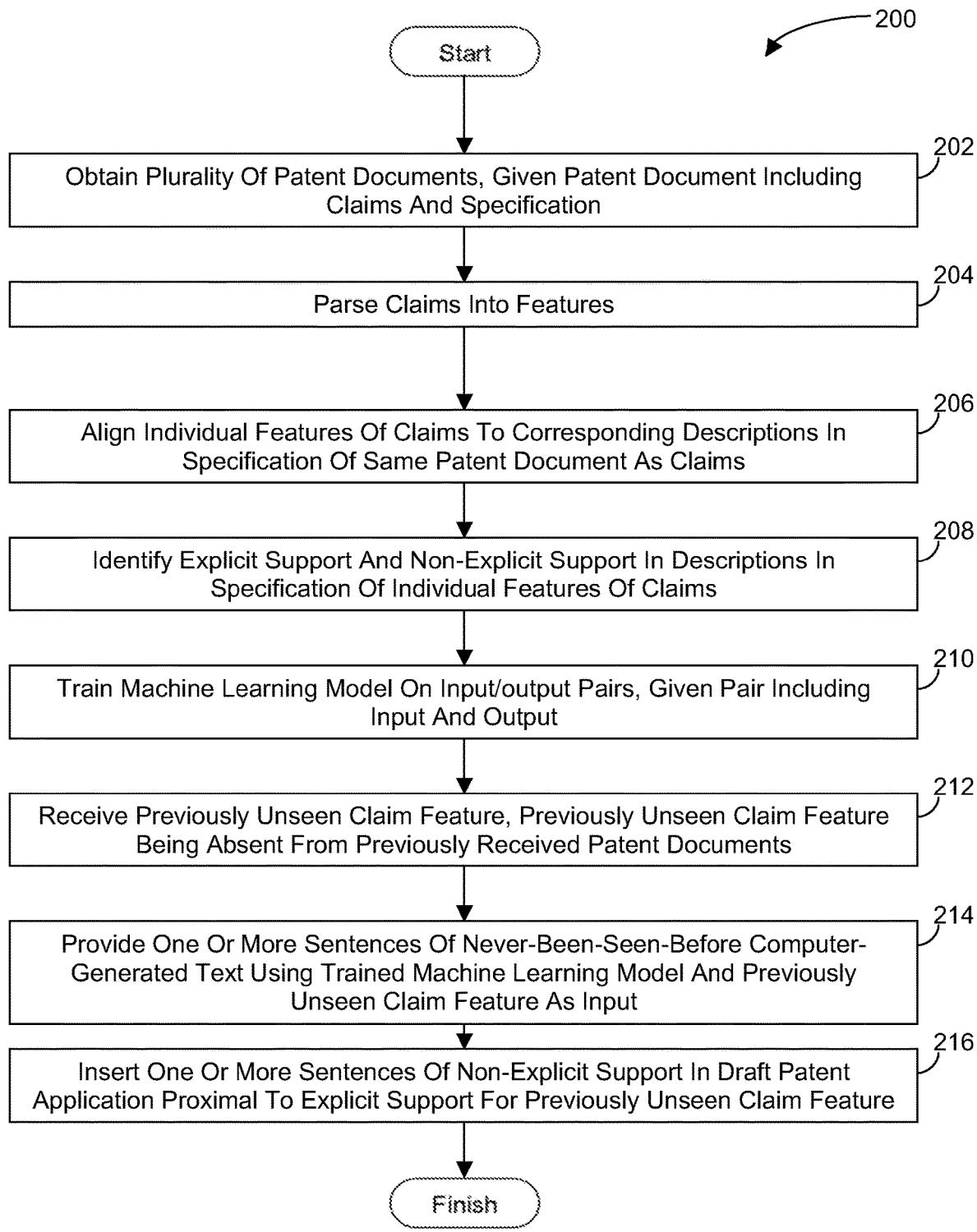
FIG. 2 illustrates a method for enhancing the depth and richness of content in computer-generated patent applications by providing non-explicit support for individual claim features, in accordance with one or more implementations.

FIG. 2 illustrates a method 200 for enhancing the depth and richness of content in computer-generated patent applications by providing non-explicit support for individual claim features, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a plurality of patent documents, a given patent document including claims and a specification. The claims may define a claimed invention. The specification may describe how to make and/or use the claimed invention. Operation 202 may be performed by one or more hardware processors configured by machine-readable instructions including a module that is the same as or similar to patent document obtaining module 108, in accordance with one or more implementations.

An operation 204 may include parsing the claims into features. The features may include main features and sub features, a given main feature describing a primary element of the claimed invention, a given sub feature providing additional description of a corresponding main feature. Operation 204 may be performed by one or more hardware processors configured by machine-readable instructions including a module that is the same as or similar to claim parsing module 110, in accordance with one or more implementations.

An operation 206 may include aligning individual features of the claims to corresponding descriptions in a specification of the same patent document as the claims. Aligning may include identifying pairs of text spans, a given pair of text spans including a first text span and a second text span. The first text span may cover one or more features of a claim. The second text span may cover one or more portions of the specification. The given pair of text spans may describe or relate to the same subject matter. Operation 206 may be performed by one or more hardware processors configured by machine-readable instructions including a module that is the same as or similar to feature alignment module 112, in accordance with one or more implementations.

An operation 208 may include identifying explicit support and non-explicit support in the descriptions in the specification of the individual features of the claims. The explicit support may include verbatim or near-verbatim recitation of claim features in the specification. The non-explicit support may include description that is related to a given claim feature and lacks verbatim or near-verbatim recitation of claim features. Operation 208 may be performed by one or more hardware processors configured by machine-readable instructions including a module that is the same as or similar to support identifying module 114, in accordance with one or more implementations.

An operation 210 may include training a machine learning model on input/output pairs, a given pair including an input and an output. The input may include a given claim feature parsed from a given one of the plurality of patent documents.

The output may include a corresponding portion of the given one of the plurality of patent documents. The corresponding portion may include non-explicit support for the given feature. The corresponding portion may lack explicit support for the given feature. Operation 210 may be performed by one or more hardware processors configured by machine-readable instructions including a module that is the same as or similar to machine training module 116, in accordance with one or more implementations.

An operation 212 may include receiving a previously unseen claim feature, the previously unseen claim feature being absent from the previously received patent documents. Operation 212 may be performed by one or more hardware processors configured by machine-readable instructions including a module that is the same as or similar to claim feature receiving module 118, in accordance with one or more implementations.

An operation 214 may include providing one or more sentences of never-been-seen-before computer-generated text using the trained machine learning model and the previously unseen claim feature as input. The text may convey non-explicit support for the previously unseen claim feature. Operation 214 may be performed by one or more hardware processors configured by machine-readable instructions including a module that is the same as or similar to sentence providing module 120, in accordance with one or more implementations.

An operation 216 may include inserting the one or more sentences of non-explicit support in a draft patent application proximal to explicit support for the previously unseen claim feature. Operation 216 may be performed by one or more hardware processors configured by machine-readable instructions including a module that is the same as or similar to sentence insertion module 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide non-explicit support for individual claim features in computer-generated patent applications, the system comprising:
   one or more hardware processors configured by machine-readable instructions to:
   obtain a plurality of patent documents, the plurality of patent documents including specifications and sets of claims, an individual patent document in the plurality of patent documents including an individual set of claims and an individual specification, the individual set of claims defining an individual claimed invention, the individual specification describing how to make and/or use the individual claimed invention;
   parse the sets of claims into features, the features including main features and sub features, an individual main feature describing an individual primary element of the individual claimed invention, an individual sub feature providing additional description of an individual corresponding main feature;
   identify individual features and corresponding descriptions in individual specifications of a same patent document as the individual sets of claims from which the individual features were parsed, wherein identifying the individual features includes identifying pairs of text spans, a given pair of text spans including a first text span and a second text span, the first text span covering one or more features of a claim, the second text span covering one or more portions of a given specification, the given pair of text spans describing or relating to same subject matter;
   identify explicit support and non-explicit support in the descriptions in the specifications of the individual features of the claims, the explicit support including verbatim or near-verbatim recitation of the features in the specifications, the non-explicit support including description that is related to a given feature and lacks the verbatim or the near-verbatim recitation, wherein the explicit support is identified using one or more of an exhaustive comparison using Levenshtein distance, a locality-sensitive hashing with the Jaccard similarity metric or cosine similarity metric, or sum of word vectors;
   train a machine learning model on input/output pairs derived from the plurality of patent documents, an individual input/output pair including an input and an output, the input including a given feature parsed from a given one of the plurality of patent documents, the output including a corresponding portion of the given one of the plurality of patent documents, the corresponding portion including the non-explicit support for the given feature, the corresponding portion lacking the explicit support for the given feature;
   receive a previously unseen claim feature, the previously unseen claim feature being absent from the plurality of patent documents;
   determine one or more sentences of never-been-seen-before computer-generated text using the machine learning model as trained and the previously unseen claim feature as input, the text conveying non-explicit support for the previously unseen claim feature; and
   insert the one or more sentences of the non-explicit support for the previously unseen claim feature in a draft patent application proximal to explicit support for the previously unseen claim feature.

2. The system of claim 1, wherein the plurality of patent documents includes one or both of published patent applications or issued patents.

3. The system of claim 1, wherein the non-explicit support includes one or more of relevant definitions, illustrative examples, descriptions of alternative implementations, or details not found in the claims.

4. The system of claim 1, wherein the machine learning model includes one or more of a statistical string transducer, a recurrent neural network, a sequence-to-sequence neural model, a convolutional neural network, a template extraction, a phrase-based machine translation transduction techniques, or a syntax-based machine translation transduction technique.

5. The system of claim 1, wherein the previously unseen claim feature is associated with a partially-drafted patent application.

6. The system of claim 1, wherein the previously unseen claim feature is associated with a computer-generated draft patent application.

7. The system of claim 1, wherein providing the one or more sentences includes converting an input string into a fixed-length vector of real-valued numbers.

8. The system of claim 7, wherein providing the one or more sentences includes using greedy decoding to produce a best word token at individual positions in the one or more sentences.

9. The system of claim 7, wherein providing the one or more sentences includes using beam-search decoding to approximate a best overall output string for the one or more sentences.

10. A method to provide non-explicit support for individual claim features in computer-generated patent applications, the method comprising:

obtaining a plurality of patent documents, the plurality of patent documents including specifications and sets of claims, an individual patent document in the plurality of patent documents including an individual set of claims and an individual specification, the individual set of claims defining an individual claimed invention, the individual specification describing how to make and/or use the individual claimed invention;

parsing the sets of claims into features, the features including main features and sub features, an individual main feature describing an individual primary element of the individual claimed invention, an individual sub feature providing additional description of an individual corresponding main feature;

identify individual features and corresponding descriptions in individual specifications of a same patent document as the individual sets of claims from which the individual features were parsed, wherein identifying the individual features includes identifying pairs of text spans, a given pair of text spans including a first text span and a second text span, the first text span covering one or more features of a claim, the second text span covering one or more portions of a given specification, the given pair of text spans describing or relating to same subject matter;

identifying explicit support and non-explicit support in the descriptions in the specifications of the individual features of the claims, the explicit support including verbatim or near-verbatim recitation of the features in the specifications, the non-explicit support including description that is related to a given feature and lacks verbatim or near-verbatim recitation features, wherein the explicit support is identified using one or more of an exhaustive comparison using Levenshtein distance, a locality-sensitive hashing with the Jaccard similarity metric or cosine similarity metric, or sum of word vectors;

training a machine learning model on input/output pairs derived from the plurality of patent documents, an individual input/output pair including an input and an output, the input including a given feature parsed from a given one of the plurality of patent documents, the output including a corresponding portion of the given one of the plurality of patent documents, the corresponding portion including the non-explicit support for the given feature, the corresponding portion lacking the explicit support for the given feature;

receiving a previously unseen claim feature, the previously unseen claim feature being absent from the plurality of patent documents;

determine one or more sentences of never-been-seen-before computer-generated text using the machine learning model as trained and the previously unseen claim feature as input, the text conveying non-explicit support for the previously unseen claim feature; and inserting the one or more sentences of the non-explicit support for the previously unseen claim feature in a draft patent application proximal to explicit support for the previously unseen claim feature.

11. The method of claim 10, wherein the plurality of patent documents includes one or both of published patent applications or issued patents.

12. The method of claim 10, wherein the non-explicit support includes one or more relevant definitions, illustrative examples, descriptions of alternative implementations, or details not found in the claims.

13. The method of claim 10, wherein the machine learning model includes one or more of a statistical string transducer, a recurrent neural network, a sequence-to-sequence neural model, a convolutional neural network, a template extraction, a phrase-based machine translation transduction techniques, or a syntax-based machine translation transduction technique.

14. The method of claim 10, wherein the previously unseen claim feature is associated with a partially-drafted patent application.

15. The method of claim 10, wherein the previously unseen claim feature is associated with a computer-generated draft patent application.

16. The method of claim 10, wherein providing the one or more sentences includes converting an input string into a fixed-length vector of real-valued numbers.

17. The method of claim 16, wherein providing the one or more sentences includes using greedy decoding to produce a best word token at individual positions in the one or more sentences.

18. The method of claim 16, wherein providing the one or more sentences includes using beam-search decoding to approximate a best overall output string for the one or more sentences.

* * * * *